United States Patent [19]

Kavanaugh

[11] Patent Number: 5,551,366
[45] Date of Patent: Sep. 3, 1996

[54] SEAPLANE DOCKING FACILITY AND TELESCOPING HANGAR

[76] Inventor: E. Clinch Kavanaugh, 102 N. Sixth St., Fernandina Beach, Fla. 32034

[21] Appl. No.: 434,785

[22] Filed: May 4, 1995

[51] Int. Cl.$^6$ ...................................................... B63C 1/06
[52] U.S. Cl. ............................................. 114/45; 114/262
[58] Field of Search ................................ 114/44, 45, 46, 114/47, 48, 258, 261, 262; 405/1–7

[56] References Cited

U.S. PATENT DOCUMENTS

| | | | |
|---|---|---|---|
| 2,483,474 | 10/1949 | Pate | 114/262 |
| 2,501,310 | 3/1950 | Burke | 114/262 |
| 2,761,409 | 9/1956 | Harris | 114/45 |
| 3,191,389 | 6/1965 | Poe | 405/3 |
| 4,714,375 | 12/1987 | Stevenson et al. | 405/3 |

*Primary Examiner*—Ed Swinehart
*Attorney, Agent, or Firm*—Richard C. Litman

[57] ABSTRACT

A floating seaplane docking facility provides for the completed removal from the water of a seaplane, amphibious aircraft, or surface effect vehicle for ease of boarding and departing, maintenance and inspection, etc. The facility includes a non-buoyant hinged ramp with relatively low friction coefficient tracks or skids for the floats or hull of the aircraft, which tracks may be positioned as required for aircraft of different dimensions. A turntable is included in the ramp, allowing seaplanes to be taxied up onto the ramp and tracks as they are lowered into the water, and turned for maintenance and/or for ease of departing the ramp. The apparatus allows for manual or powered operation by a single person, thereby eliminating need for additional crew. A collapsible, telescoping hangar is also disclosed, which hangar may be installed in combination with the above described floating seaplane dock and is also adaptable for use by land based aircraft.

7 Claims, 7 Drawing Sheets

SEAPLANE DOCKING FACILITY AND TELESCOPING HANGAR

FIELD OF THE INVENTION

The present invention relates generally to aircraft handling and storage facilities, and more specifically to a docking or beaching ramp facility for seaplanes and the like providing for ease of removal from the water and launching of a seaplane, and further providing for a folding or telescoping hangar adaptable such a seaplane facility or to land based aircraft.

BACKGROUND OF THE INVENTION

Amphibious aircraft or pure seaplanes have numerous advantages over their strictly wheeled counterparts, in that they are not limited to airports specifically constructed for aircraft use. In metropolitan areas, where regulations permit, seaplanes can often provide more rapid transportation between urban centers due to their ability to use a close-in body of water as a landing facility. Their use is especially valuable in wilderness areas, where often there are no roads into a given area and no prepared landing fields exist.

The disadvantage of such aircraft is that by their nature they are essentially continually exposed to water and a damp environment. Even in fresh water, the chemicals (e.g., acid rain) and other pollutants can cause rapid corrosion of the aluminum and steel alloys used in aircraft unless more or less continual maintenance and cleanup is performed. Moreover, such aircraft provide difficulties in boarding and departing the aircraft skin to those encountered with a small boat, if not greater. The lesser maneuverability and greater surface area of such seagoing aircraft render them much more difficult to handle than a boat when on the surface, particularly in crosswind conditions and/or when approaching a leeward dock or shore. Generally, at least two experienced people are required to handle even a small seaplane under such conditions, which greatly reduces the efficiency and convenience otherwise obtainable for such an aircraft.

The need arises for a docking facility for seaplanes and the like, which facility provides for the removal of a seaplane from the water and the launching thereof by a single person. The facility must provide for the complete removal of the aircraft from the water, in order to allow the aircraft to be inspected prior to flight or for other maintenance and refueling, and for the convenient boarding and departure of passengers. The facility must also provide for the maneuvering of an aircraft completely onto the facility, and the maneuvering of the aircraft thereon for subsequent launching, by a single person, such as the pilot of the aircraft. It must also be adaptable for use by various sizes of seaplanes and/or amphibious aircraft, including unconventional aircraft designs such as surface effect or wing in ground effect vehicles, and optionally provide for the shelter thereof by means of a folding or telescoping shelter, which shelter may be adapted to land based aircraft also.

DESCRIPTION OF THE PRIOR ART

U.S. Pat. No. 2,483,474 issued to Carson H. Pate on Oct. 4, 1949 discloses a Seaplane Landing Ramp having a plurality of ratcheted rollers on tracks of fixed spacing, which tracks provide for the movement of a seaplane therealong. A turntable is also disclosed with like rollers, but the ramp itself does not provide for the rotation of the seaplane thereon; the seaplane must be pulled completely past the ramp and onto a second platform in order to be turned. The fixed width of the tracks limits use of the device to a relatively small number of aircraft, and the device is exceedingly complex for equipment which will be continually exposed to a marine environment; continuous maintenance would be needed to preclude corrosion, jamming, etc.

U.S. Pat. No. 2,501,310 issued to Richard L. Burke on Mar. 21, 1950 discloses a Seaplane Terminal Dock including one or more rotatable cradles at the end(s) of a dock element. The cradles are not installed in or on the ramp itself, and in fact no sloped ramp of any sort is disclosed. The turntable portion(s) is/are disposed completely within the water, and a seaplane is maneuvered within the turntable cradle while still in the water, unlike the present invention. The complete submersion of much of the mechanism within the water, would lead to potential corrosion and other problems, in the case of the Pate device discussed above.

U.S. Pat. No. 2,761,409 issued to Frederic R. Harris Sept. 4, 1956 discloses a Water-Borne Airplane Terminal similar to the Burke apparatus discussed above. Again, the seaplane is secured within a maneuvering cradle while still in the water, rather than being placed upon the upper surface of a platform and out of the water for maneuvering.

U.S. Pat. No. 3,191,389 issued to Joe B. Poe on Jun. 29, 1965 discloses a Boat Lift having an open framework ramp hinged to the vertical rear wall of an enclosed boat house. The lifting means comprises two cables extending vertically from the outer corners of the ramp. The device is not adaptable to use with aircraft, due to the relatively wide wingspan of airplanes and the lack of provision for such due to the placement of the lifting cables. Also, no provision is made for the rotation of the boat upon the ramp for maintenance, etc.

Finally, U.S. Pat. No. 4,714,375 issued to Ernest W. Stevenson et al. on Dec. 22, 1987 discloses a Seaplane And Dock Lift in which the lifting platform remains level, rather than being hinged and lifted at only one end, as in the present invention. No turntable for the rotation of the aircraft is disclosed.

None of the above noted patents, taken either singly or in combination, are seen to disclose the specific arrangement of concepts disclosed by the present invention.

SUMMARY OF THE INVENTION

By the present invention, an improved seaplane docking facility is disclosed.

Accordingly, one of the objects of the present invention is to provide an improved seaplane docking facility which is adaptable to all types of seagoing aircraft, such as seaplanes, amphibious aircraft, and wing-in-ground-effect or surface effect vehicles. Another of the objects of the present invention is to provide an improved seaplane docking facility which provides for the complete removal of the aircraft from the water for preflight inspection, maintenance, boarding or departing the aircraft, etc.

Yet another of the objects of the present invention is to provide an improved seaplane docking facility which provides lifting means for the aircraft which means are disposed beneath the aircraft to provide clearance for the wings and other aircraft structure.

Still another of the objects of the present invention is to provide an improved seaplane docking facility which includes means for the rotation of the aircraft thereon to facilitate the docking and launching thereof.

A further object of the present invention is to provide an improved seaplane docking facility which provides for the manual or powered lifting and maneuvering of the aircraft thereon.

An additional object of the present invention is to provide an improved seaplane docking facility which includes a buoyant or floating peripheral structure with a ramp area generally centrally disposed therein, using either buoyant or non-buoyant lift means.

Another object of the present invention is to provide an improved seaplane docking facility which includes plural tracks for the seaplane floats or hull, which tracks are laterally adjustable for different aircraft.

Yet another object of the present invention is to provide an improved seaplane docking facility which may include a folding or telescoping shelter or hangar, which hangar may be provided to land based aircraft in addition to the combination with the seaplane facility of the present invention.

A final object of the present invention is to provide an improved seaplane docking facility for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the several figures of the attached drawings.

DETAILED DESCRIPTION OF THE PREFERRED EMBODIMENTS

Figure 1:
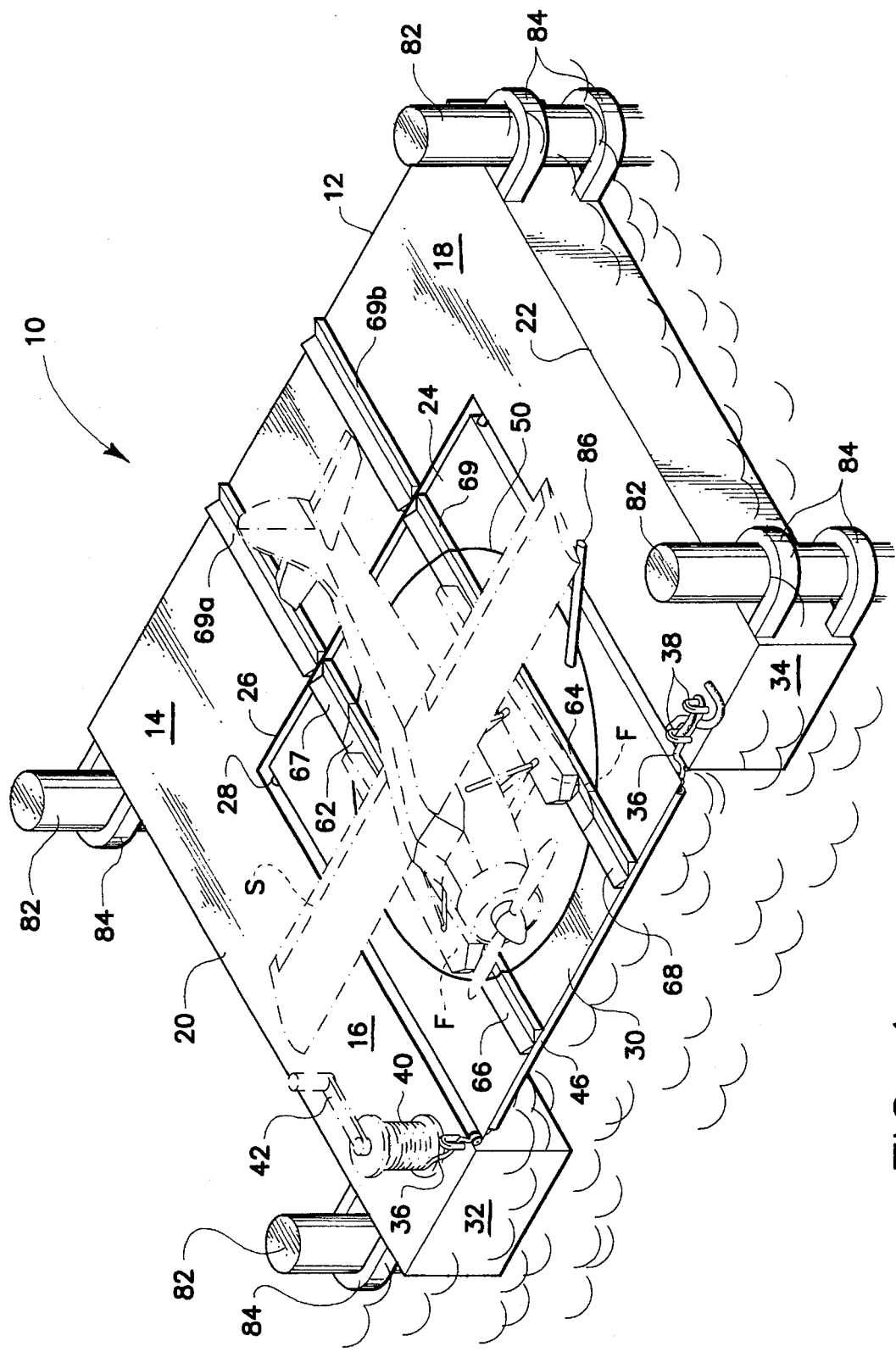
FIG. 1 is a perspective view of the seaplane docking facility of the present invention, showing its general configuration.

Referring now particularly to FIG. 1 of the drawings, the present invention will be seen to relate to a seaplane docking facility 10 providing for the removal from the water, maneuvering, and insertion into the water of a seaplane S or the like. While typical float plane having a separate fuselage and laterally spaced apart floats is shown, it will be understood that the term "seaplane" also includes amphibious aircraft having either floats or a hull(s), and other types of airborne vehicles capable of alighting on and departing from the water, such as surface effect vehicles and/or wing-in-ground-effect vehicles. The present invention is equally adaptable to any or all of the above types of vehicles.

Docking facility 10 comprises a generally U-shaped peripheral float 12, having a lateral rearward base portion 14 with generally parallel and spaced apart first and second arms 16 and 18 extending forward respectively from the first and second ends 20 and 22 of the rearward portion 14. The span or length of the rear portion 14 of the float 12, and thus the distance across the two lateral arms 16 and 18, is preferably at least slightly greater than the wingspan of the seaplane S, in order to provide for the installation of a hangar or shelter thereon, if desired. However, it will be seen that the total span of the facility may be narrower than the wingspan of an aircraft docked thereon, if no overlying structure is installed; the wings may extend past the outboard edges of the two lateral arms 16 and 18.

Figure 2:
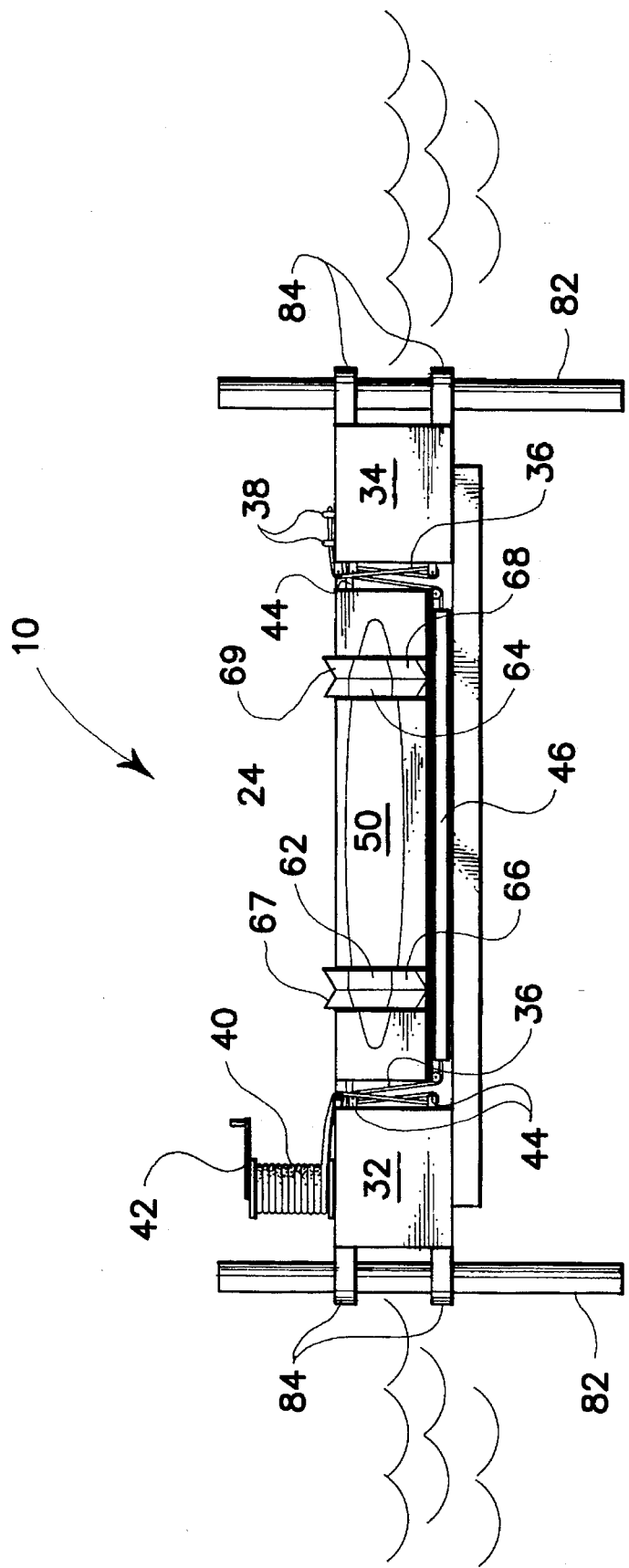
FIG. 2 is a front elevation view, showing details of the structure and lifting means for the ramp.

The span between the two arms 16 and 18 includes a ramp therebetween which is secured adjacent the forward or inner edge of the rearward float member 14 by means of hinges 28. The opposite or forward end 30 of the ramp 24 is arcuately movable between the two forward ends 32 and 34 respectively of the first and second spaced apart float arms 16 and 18 of the float 19. The forward end 30 of the ramp 12 is supported by a cable or rope 36 which is secured (e.g., by means of clamps 38) to the second float arm end 34 and passes beneath the forward end 30 of the ramp 12 to a winch 40 installed atop the first float arm end 32. The winch 40 may be manually actuated by means of a crank 42; a series of pulleys 44 may be provided in a "block and tackle" arrangement for greater mechanical advantage for manual (or powered) systems, if desired. A clearer view of the pulleys 44 and fairlead 46 (e.g., pipe) beneath the forward edge 30 of the ramp 12 is shown in FIG. 2, as well as one of the lateral structural tie members 48 extending between the two float arms 16 and 18 to provide greater strength and rigidity to the float 12.

Figure 2A:
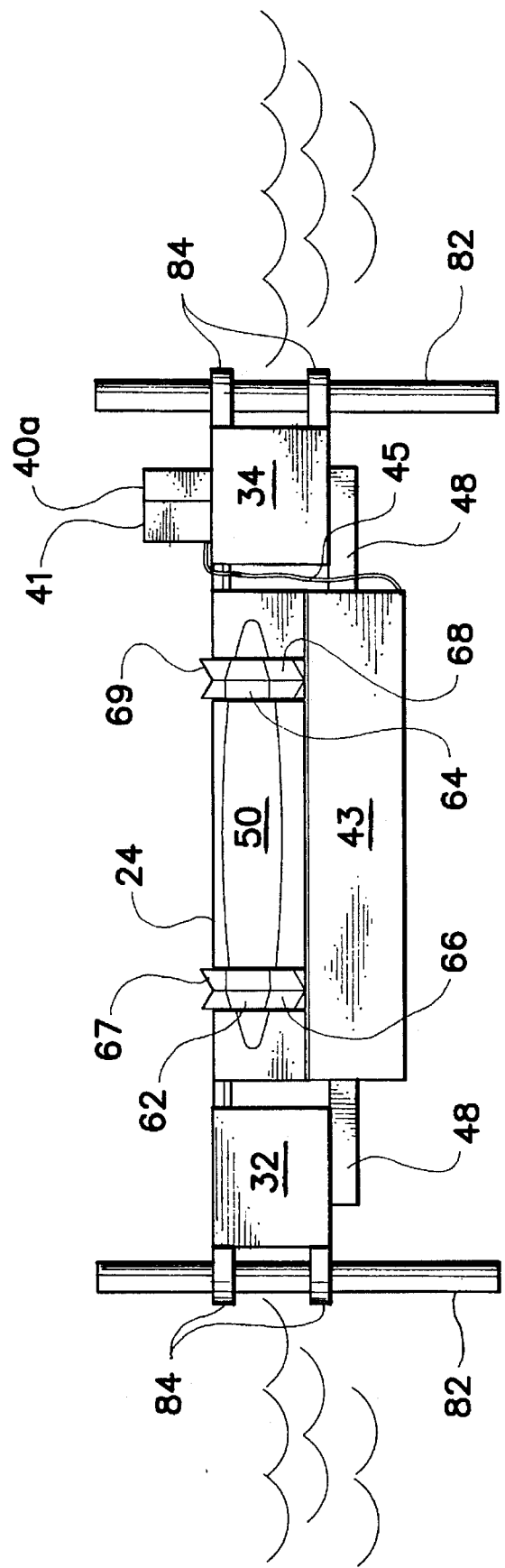
FIG. 2A is a front elevation view, showing details of an alternate embodiment of the ramp structure and lifting means.

Alternatively, the lifting means for the forward edge 30 of the ramp 24 may be powered as shown in FIG. 2A. A motor 40a may be used to drive a pump 41 which is connected to a tank or float 43 installed beneath the forward edge 30 of the ramp 24. The tank or float 43 communicates with the pump 41 by means of a line 45 between the pump 41 and the tank or float 43. Thus, the motor 40a (electric, hydraulic, or,combustion) may be used to provide power to actuate the pump 41 to provide buoyancy to the tank or float 43, as desired to raise and lower the forward edge 30 of the ramp 24. Such a powered means may also be used to drive a hydraulic pump and hydraulic motors or cylinders (not shown) to raise or lower the forward edge 30 of the ramp 24.

Figure 3:
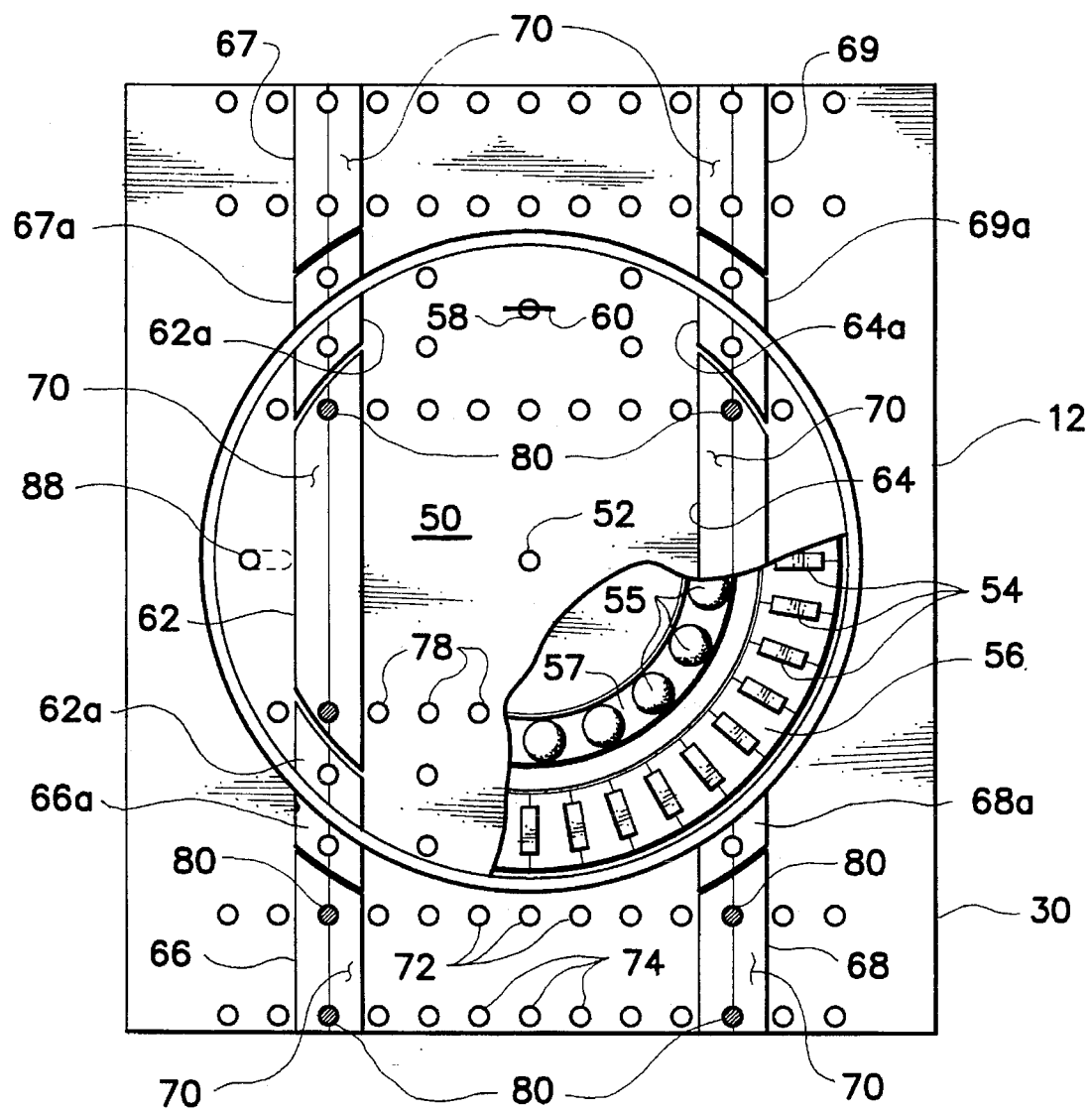
FIG. 3 is a plan view of the ramp, partially cut away showing the lateral adjustment means for the float or hull tracks and the bearing means for the rotating turntable.

The ramp 24 includes a central turntable 50, more clearly shown in FIG. 3 of the drawings. The turntable 50 rotates or revolves about a central pivot or axis 52, and is supported by a series of bearings, e.g., rollers 54 and/or ball bearings 55 disposed in circumferential paths or race 56 and 57 beneath the outer portion of the turntable 50. The turntable 50 is preferably installed so that the upper surface is coplanar with the upper surface of the ramp 24, in order to eliminate a possible tripping hazard to persons on the ramp 24 and for further reasons discussed below. In a like manner, the upper surface of the ramp portion is preferably coplanar with the upper surface of the float portion 12 of the present invention. A locking passage 58 is provided through the turntable 50 to the underlying structure, through which a locking pin 60 may be inserted to secure the turntable 50 against rotation relative to the ramp 24.

Both the turntable 50 and the forward edge or portion 30 of the ramp 24 should include at least one skid for each of the flotation members of the seaplane to be supported thereon. The embodiment depicted in the drawing figures shows a first and a second turntable skid 62 and 64, a first and a second forward ramp skid 66 and 68, and a first and a second rear ramp skid 67 and 69 for the two floats F typically found on a light float plane or seaplane S. (Additional skids 69a and 69b are shown in FIG. 1 extending across the rear portion 14 of the float 12, to provide for movement of the aircraft S across the docking facility 10 to an adjacent area.) However, it Will be understood that more skids may be provided (e.g., for a central hull and left and right sponsors or tip floats, etc. ) without departing from the scope of the present invention. Each of the skids 62 through 69 is preferably formed having a V shaped upper surface 70, in order to preclude lateral slippage of the float, thereon, and preferably the upper surfaces 70 include a coating having a low coefficient of friction, e.g., Teflon (TM) in order to allow the floats F to be more readily moved or slid upon the skids 62 through 69.

The present invention further provides for seaplanes S of different sizes and configurations by allowing the various skids 62 through 69 to be adjustably positioned on the ramp 24 and turntable 50. A series of first and second ramp skid passages 72 and 74 are provided laterally along the front edge 30 of the ramp 12, and a like series of first and second turntable skid passages 76 and 78 are provided laterally across the turntable 50. The respective skid portions 62 through 69 include securing means 80 (e.g., comprising cooperating passages providing for the insertion of pins therethrough, or pins or dowels, not shown, extending from the bottom surfaces thereof) enabling the various skids 62 through 69 to be laterally positioned or spaced apart as desired on the ramp 24 and turntable 50.

It will be noted that as the skids 62 through 69 are repositioned inwardly from the positions shown in the drawing Figures, that the arcuate edge of the turntable would result in the circumferential ends of the turntable skids 62 and 64 being somewhat short of the turntable edge, while the mating ends of the ramp skids would extend over the edge of the turntable 50 to some extent. Conversely, the turntable skids 62 and 64 would extend over a portion of the ramp 24 when the skids 62 through 69 are repositioned outwardly for more widely spaced floats. Accordingly, forward ramp skid segments 66a and 68a, rear ramp skid segments 67a and 69a, and turntable skid segments 62a and 64a are provided. These shorter skid segments 62a, 64a, 66a, 67a, 68a and 69a may be installed as spacers between the ends of the ramp skids and turntable skids in order to adjust the gap or spacing between the ramp and the turntable edge as the spacing of the skids is adjuster laterally. These shorter skid segments install on the ramp and turntable in the same manner as the longer skids.

The float portion 12 (and thus the ramp portion 24 hingedly secured thereto) may be secured relative to the shore or bottom by means of a series of substantially vertical columns or pilings 82 driven into the bottom, with a plurality of retaining loops 84 extending from the float portion 12 of the docking facility 10 and passing around the pilings 82 to allow the facility 10 to float upward or downward with changes in water level due to tides, etc., while retaining the facility 10 in a fixed position relative to the shore or bottom of the body of water. A ramp or gangway (not shown) or other means may be used to provide passage from the shore to the docking facility 10. Alternatively, the retaining loops 84 may be used to secure the facility 10 to the pilings of an existing dock or pier (not shown), if desired.

The present invention provides a convenient means of docking alighting from and boarding, refueling, maintaining and inspecting, and launching a seaplane S by means of its many features. In order to launch a seaplane S, the forward edge 30 of the ramp 24 is lowered into the water, thereby providing a sloped ramp which, by means of the low coefficient of friction of the upper surfaces 70 of the skids 62 through 69, allows the seaplane S to slide into the water readily with the addition of a slight amount of power once the engine is operating. The seaplane S may then be taxied away from the docking facility and normal operations undertaken.

When the seaplane S returns, it may be taxied at least partially up the skids 62 through 69 on the lowered ramp 24 by means of the low coefficient of friction surfaces 70 thereon. Once the seaplane S has been at least partially docked, it may be drawn completely upon the turntable 50 by means of a winch (not shown) if needed. The arrangement of the docking facility 10 will be seen to place the seaplane S in the opposite direction of that shown in FIG. 1, immediately after docking. The ramp 24 may then be lifted by means of the cable 36 and winch 40 arrangement (or powered lifting means) earlier described, to provide a level, coplanar surface for passengers and/or crew to use, and to remove the seaplane S completely from the water. The seaplane S may then be unloaded, refueled, maintained, inspected, and/or loaded for another flight as appropriate. When ready for launch, the turntable locking pin 60 may be removed from the turntable locking passage 58, allowing the turntable 50 (and the seaplane thereon) to be rotated 180 degrees for a subsequent launch. While the seaplane S (and the turntable 50 upon which it is resting) may be turned by pushing or pulling upon some portion of the aircraft structure, it may be desirable (particularly in the case of larger aircraft) to provide a means of turning the turntable directly. FIG. 1 discloses a pole 86 which extends outwardly and upwardly from a passage 88 (FIG. 3) near the outer edge of the turntable 50. Thus, a user of the facility 10 may insert the pole 86 into the passage 88, and use the pole 86 for leverage to turn the turntable 50. One or more poles 86 and passages 88 may be provided.

The forward edge 30 of the ramp 24 is then lowered into the water once again for the launch of the seaplane S. Thus, the present invention allows a seaplane S to be removed from the water readily, allowing the crew and/or passengers to remain dry without risk of immersion while boarding or departing the aircraft. The turntable 50 allows the seaplane S to be taxied straight up onto the ramp 24 without under concern for adverse wind corrections, the need to approach a dock laterally and the ensuing difficulties in that maneuver, especially in windy conditions and/or with a tide or current flowing. Yet, the present facility 10 allows the seaplane S to be launched in a straightforward manner without the standard complications and hazards, by means of the rotatable turntable 50.

Figure 4:
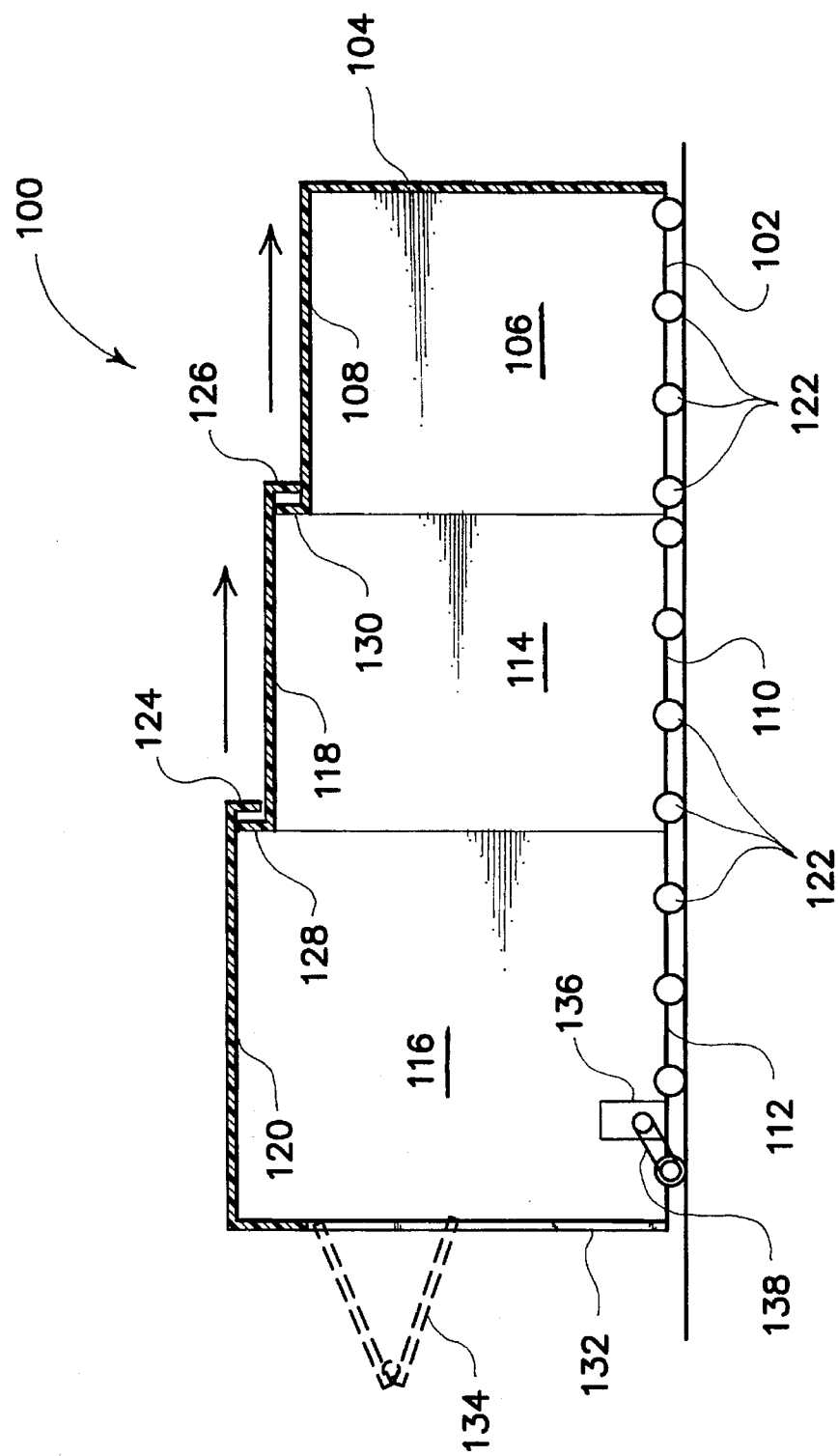
FIG. 4 is a side view in section of the telescoping hangars of the present invention, showing its general configuration.
Figure 5:
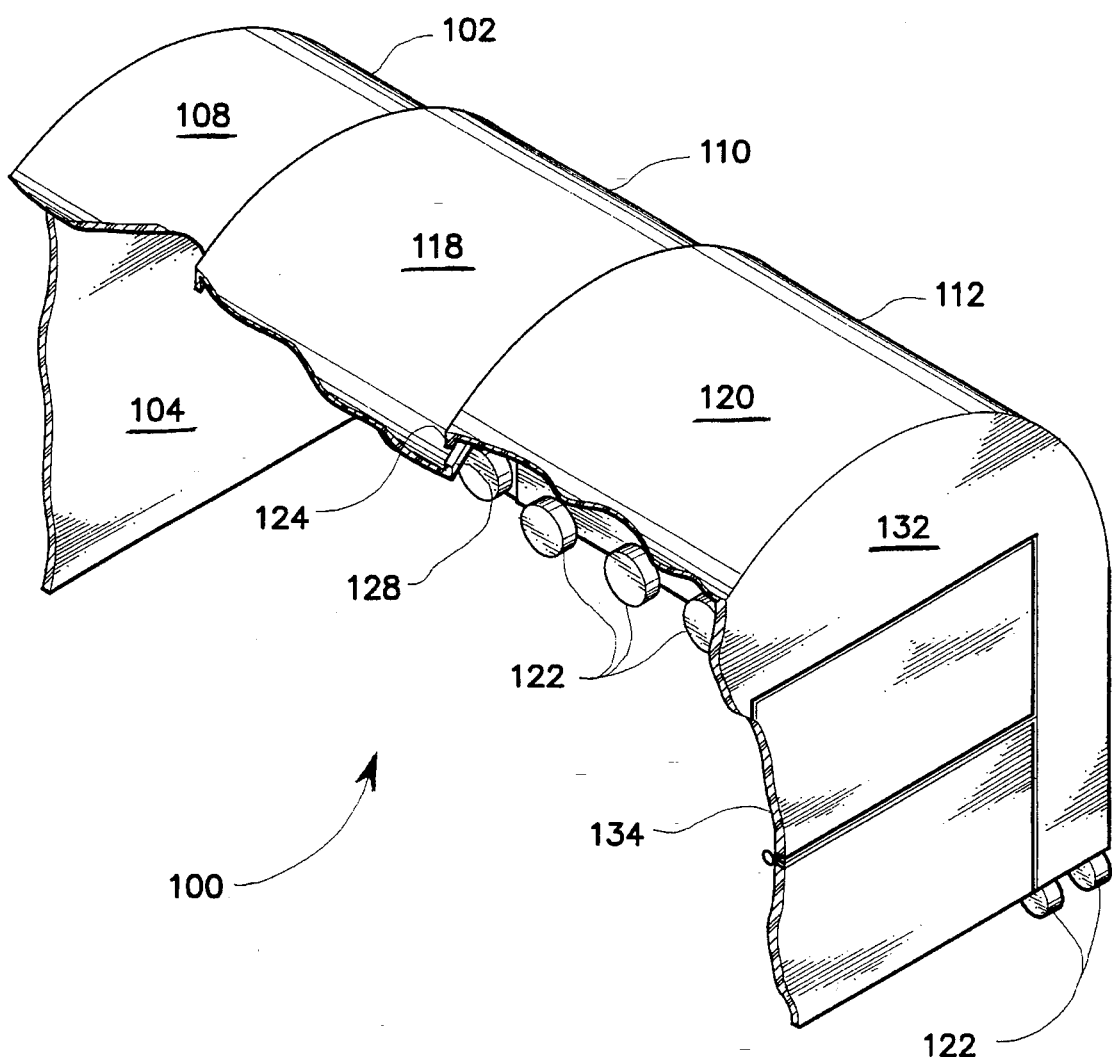
FIG. 5 is a broken away perspective view of the hangar of FIG. 4 in its extended and closed condition.
Figure 6:
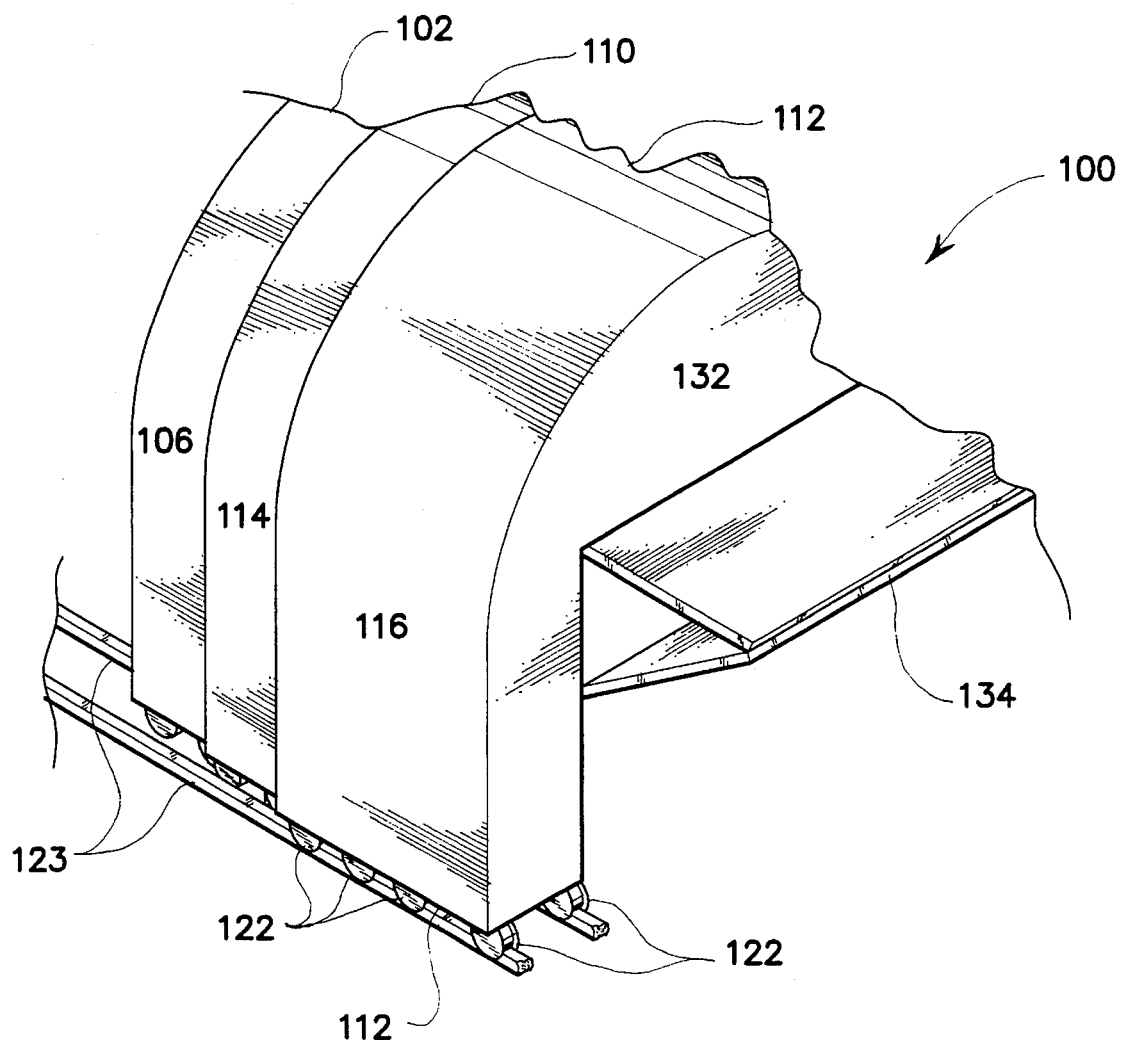
FIG. 6 is a broken away perspective view of the hangar of FIG. 4 in its retracted and open condition.

Additional protection for a seaplane S or other aircraft may be provided by means of the telescoping hangar 100 shown in FIGS. 4 through 6. Hangar 100 includes a movable rearward section 102 having a rear wall 104, side walls 106, and a roof 108, and a plurality of increasingly larger movable sections (e.g., sections 110 and 112 shown in the drawings) which are extendible from and collapsible on the fixed section 102. While three sections (a rearward section 102, an intermediate section 110 and a forward section 112) are shown in FIGS. 4 through 6, it will be understood that more or fewer movable intermediate sections may be provided as desired or required. Sections 110 and 112 also respectively include sidewalls 114 and 116, and roof portions 118 and 120, in the manner of the fixed rear section 102. While the telescoping hangar 100 of FIGS. 4 through 6 is shown to be of substantially semicircular form with a rounded roof, it will be seen that the mechanism lends itself to other structural shapes, e.g., substantially vertical walls and flat or pitched roofs, etc. The important point is that the plurality of hangar sections are of like configuration and provide for the telescoping of the various sections together, as shown.

The various sections 102, 110 and 112 of the hangar 100 are equipped with wheels, rollers or casters 122 along the bases of each of their respective side walls 106, 114 and 116. These wheels 122 provide for ease of movement of the movable sections back over the fixed section when collapsing of the hangar 100 is desired, and to be extended outward to full length when extension is desired. Tracks 123 may be provided on the underlying surface for greater support and guidance of the wheels 122, and thus at least one hangar section, if desired, as shown in FIG. 6. While only one set of tracks 123 is shown in FIG. 6, for the support and guidance of the front section 112, it will be seen that additional tracks may be installed for other sections of the hangar 100 if desired.

Each of the movable sections 110 and 112 respectively includes a circumferential depending flange 124 and 126 extending inwardly from the rear edges of the walls and roof, which flanges 124 and 126 engage outwardly extending flanges 128 and 130 located respectively on the forward i edges of the intermediate and rear sections 110 and 100. The depending flanges 124 and 126 of the forward and intermediate sections 112 and 110 respectively engage the extending flanges 128 and 130 of the intermediate and read sections 110 and 100, in order to provide stop means for the maximum extension of the hangar 100 and for security and weather tightness of the hangar 100.

Further security is provided by a front wall 132 at the forward end of the forward section 112, and a door 134 therein. The door 134 may be of any suitable type, but the vertically opening bifold door 134 shown in the drawings is of particular advantage in the present invention, as the limited exterior space provided for such a hangar 100 installed upon a seaplane docking facility would preclude the Use of doors having external lateral tracks or the like. Door 134 preferably spans the majority of the width of the front wall 132, in order to maximize access to the interior and provide for ease of installation and removal of an aircraft therein. Other openings (not shown), such as a smaller personnel door(s) and window(is) may be included, as desired.

The hangar 100 of the present invention is particularly suited to confined areas, such as the seaplane docking facility 10 discussed above. When access to an aircraft stored therein desired, the forward door 134 may be opened and the movable forward and intermediate sections pushed back over the fixed rear section to expose the hangar area to provide for ease of access from the sides (e.g., boats, etc. for a seaplane facility, or other vehicles for a land based facility). In the case of a relatively large hangar, a motor 136 (e.g., electric, pneumatic or hydraulic as shown in FIG. 4, maybe provided to drive the various movable sections by means of a linkage (e.g., chain or belt 138, FIG. 4) to one or more of the wheels 122 of at least the forward section 112. The door 134 may also be motorized as required or desired. When the contents of the hangar are to be secured, the process is reversed and the movable sections are extended to the maximum extent permitted by the stop means described above, and the hangar door 134 closed and secured. Locking means (e.g., pins securing the various sections 102, 110, and/or 112 to the underlying surface) may be used to secure the various sections in both their open and closed positions, as well as in one or more intermediate positions, as desired.

It is to be understood that the present invention is not limited to the sole embodiments described above, but encompasses any and all embodiments within the scope of the following claims.

I claim:

1. A seaplane docking facility installable in a body of water and providing for use by seaplanes, amphibious aircraft, and surface effect vehicles, comprising:

a substantially U-shaped buoyant member having an outer periphery and comprising a base portion with first and second end s and with first and second arms extending respectively from said base portion first and second ends at substantially right angles to said base portion, with said first and second arms respectively terminating in a first arm end and a second arm end;

a ramp member having a first edge adjacent said base portion and being hingedly attached to said buoyant member adjacent said base portion and extending between said first and second arms, and a second forward edge opposite said first edge and extending between said first arm end and said second arm end;

lifting means for said ramp member disposed beneath said ramp member forward edge;

said ramp member having an upper surface and including a turntable installed therein, said turntable having a periphery and an upper surface substantially coplanar with said upper surface of said ramp member;

a plurality of skid tracks each having an upper surface having a low coefficient of friction, with at least one turntable skid track installed upon said turntable and extending substantially thereacross, at least one ramp skid track installed between said forward edge of said ramp member and said turntable, and at least one ramp skid track installed between said turntable and said rearward edge of said ramp, whereby;

a craft resting upon said turntable is launched into the water by turning said turntable to position the craft to face toward said forward edge of said ramp member, said ramp member is lowered to place said forward edge of said ramp member in the water and the craft resting upon said turntable is slidably moved along said skid tracks each having an upper surface having a low coefficient of friction, with the operation being reversed for the recovery of the craft to position the craft upon said turntable.

2. The seaplane docking facility of claim 1 wherein:

said lifting means for said ramp member comprises a cable having a first end secured to said second arm of said buoyant member and extending through a fairlead beneath said ramp member to a second end connected toga winch installed upon said first arm of said buoyant member, whereby;

said ramp member is lifted by means of said cable beneath said ramp member being drawn upon said winch when said winch is actuated to wind said cable upon said winch.

3. The seaplane docking facility of claim 1 wherein:

said lifting means for said ramp member comprises a selectively buoyant tank disposed beneath said ramp member, with said selectively buoyant tank connected to a pneumatic pump means providing for the selective inflation of said tank.

4. The seaplane docking facility of claim 1 including:

bearing means comprising installed beneath said turntable, whereby;

said turntable rotates relative to said ramp member upon said bearing means to provide for ease of rotation of said turntable and a craft positioned thereon.

5. The seaplane docking facility of claim 1 including:

locking means for said turntable relative to said ramp member, whereby rotation of said turntable is prevented when said locking means is engaged.

6. The seaplane docking facility of claim 1 including:

means providing for the lateral adjustment of said plurality of skid tracks upon said turntable and said ramp member, comprising;

a plurality of laterally spaced passages in said turntable and said ramp member and a plurality of cooperating passages in said plurality of skid tracks providing for the selective installation of said plurality of skid tracks upon said turntable and said ramp member by means of a plurality of skid track locking pins inserted through said cooperating passages in said plurality of skid tracks and into said passages in said turntable and said ramp member.

7. The seaplane docking facility of claim 1 including:

means providing for the securing of said seaplane docking facility relative to land, comprising;

a plurality of substantially vertical pilings disposed immediately adjacent said outer periphery of said buoyant member and extending downward and secured in a fixed and immovable position to the bottom beneath said seaplane docking facility, and a plurality of retaining loops secured to said buoyant member with at least one of said retaining loops passing around each of said pilings, whereby;

said seaplane docking facility is free to move vertically relative to said pilings according to changes in the water level upon which said seaplane docking facility is floating, and said seaplane docking facility is captured relative to the land by means of said fixed and immovable position of said plurality of pilings.

* * * * *